United States Patent [19]

Galba et al.

[11] Patent Number: 5,341,986

[45] Date of Patent: Aug. 30, 1994

[54] CONTROL CIRCUIT AND DEVICE FOR HUMIDIFYING AIR IN A HEATING SYSTEM

[76] Inventors: Mark A. Galba, 4501 Prescott Ave., Apartment 2-B, Lyons, Ill. 60534; Gus N. Gallas, 8943 W. Sandra La., Hickory Hills, Ill. 60457

[21] Appl. No.: 140,666

[22] Filed: Oct. 21, 1993

[51] Int. Cl.⁵ .............................................. F24F 6/00
[52] U.S. Cl. ...................................... 236/11; 236/44 C; 126/113
[58] Field of Search .................. 236/44 R, 44 A, 44 B, 236/44 C, 10, 11, 46 F, 46 E; 165/20, 21; 126/113; 62/171.176.1, 176.4, 176.6

[56] References Cited

U.S. PATENT DOCUMENTS

| | | | |
|---|---|---|---|
| 3,743,181 | 7/1973 | Bentley | 236/44 R |
| 3,776,214 | 12/1973 | Coffman | 236/44 C X |
| 4,361,273 | 11/1982 | Levine | 236/11 |
| 4,502,288 | 3/1985 | Lynch | 62/171 |
| 4,595,139 | 6/1986 | Levine | 236/44 R |
| 4,750,545 | 6/1988 | Hile | 165/20 |
| 4,780,254 | 10/1988 | Ando | 261/81 |
| 4,789,097 | 12/1988 | Anderson | 236/1 EB |

*Primary Examiner*—Harry B. Tanner
*Attorney, Agent, or Firm*—Lee, Mann, Smith, McWilliams, Sweeney & Ohlson

[57] ABSTRACT

A humidification system for use with a heating unit to modify and maintain a predetermined level of humidity in an enclosed space using a pulse circuit for energizing a solenoid valve to allow pulsed output of water from a misting nozzle, The system operating the pulse circuit in a plurality of modes to provide humidity to the enclosed space,

15 Claims, 3 Drawing Sheets

CONTROL CIRCUIT AND DEVICE FOR HUMIDIFYING AIR IN A HEATING SYSTEM

BACKGROUND OF THE INVENTION

1. Field of the Invention

The present invention relates to humidification systems and more particularly to a control system and device for modifying the humidity of a volume of air.

2. Description of the Prior Art

Devices and humidification systems for controlling the humidity within an area or sealed environment are well known. Such devices are typically employed in greenhouses, manufacturing processes or in other industrial applications. Humidification systems are also frequently used with heating and air conditioning systems or the like for maintaining a constant humidity in an enclosed area of a building or residential structure.

Humidification systems are often used with forced-air heating units and typically operate only during an active cycle of the heating system. Forced air heating systems energize a heat source and fan to heat and blow air throughout the enclosed area. Conventional humidification systems then add moisture to the enclosed area to maintain a predetermined level of relative humidity. This arrangement has a disadvantage of not maintaining a constant humidity and allowing greater humidity fluctuations in the heated air and area. This also has a disadvantage of providing inconsistent and ineffective humidity, thereby resulting in an inefficient humidification system.

Other disadvantages of known humidification systems occur when the forced-air heating system has a greater capacity than required to heat the enclosed area of the structure. Problems of maintaining a constant humidity occur because the humidity of the enclosed area can be rapidly and greatly decreased before a humidistatic sensor can sense the drop in humidity and call for a moisturization of the heated air. This can result in a large percentage decrease in moisture to the air before the sensor signals for an increase. The problem can be exacerbated if the humidification system is only active while the heating system is blowing heated air, whereby the humidity may never be increased enough to reach the desired level. Further problems of adding moisture to the enclosure when the furnace is deactivated has disadvantages of the added moisture condensing or pooling in the ductwork, leaking ductwork causing damage to the building, microorganism growth and other related problems.

Known humidification systems used with forced-air heating systems have controlled the moisturization of the air using various methods including using a controller to sense and measure a relative humidity based on the active cycle of the heating system (U.S. Pat. No. 4,361,373); a controller to sense and measure the humidity so as to use a time delay for regulating the activation of the humidification system with the time delay being longer in warm weather and shorter in cold weather (U.S. Pat. No. 4,595,139); and to operate the humidifier for a predetermined period of time as determined by a formed operation amount signal (U.S. Pat. No. 4,780,254).

Thus, it is desireable to provide a humidification system that can efficiently control and maintain a constant humidity within the area regardless of whether the furnace is in 15 operation. It would be desirable to provide a humidity control system that automatically controls the moisture of the air within preset levels in conjunction with a forced-air heating system. A humidification system having a simple and efficient method of controlling and maintaining the humidity of the enclosed volume of air would advance the state of the art.

SUMMARY OF THE INVENTION

The present invention provides apparatus for controlling and maintaining a constant humidity in an enclosed area that overcomes the many disadvantages of the prior art.

In brief, the present invention uses a control circuit for controlling the forced air heating unit and the humidification system. The heating unit includes a furnace and a fan to blow heated air when a thermostat signals for an increase in heat. The humidification system includes a humidistat to signal for activation of a misting device to moisturize the air when the humidistat signals for an increase in humidity. The control circuit includes an input for receiving a humidity increase signal from the humidistat and a pulse device for providing a pulsed output of moisture. A controller is connected to the input and pulse devices, the fan, and the furnace for controlling and energizing the pulse device, the furnace and the fan in response to the humidity increase signal. The controller has a unison mode operable to energize the pulse device during the energization of the furnace and fan, a bypass mode operable to energize the pulse device and the fan during the deenergization of the furnace, and a stand-by mode operable during the bypass mode to deenergize the pulse device and the fan and to energize the furnace. The device may then resume operation in either the unison or by-pass modes.

DETAILED DESCRIPTION OF THE PREFERRED EMBODIMENT

Figure 1:
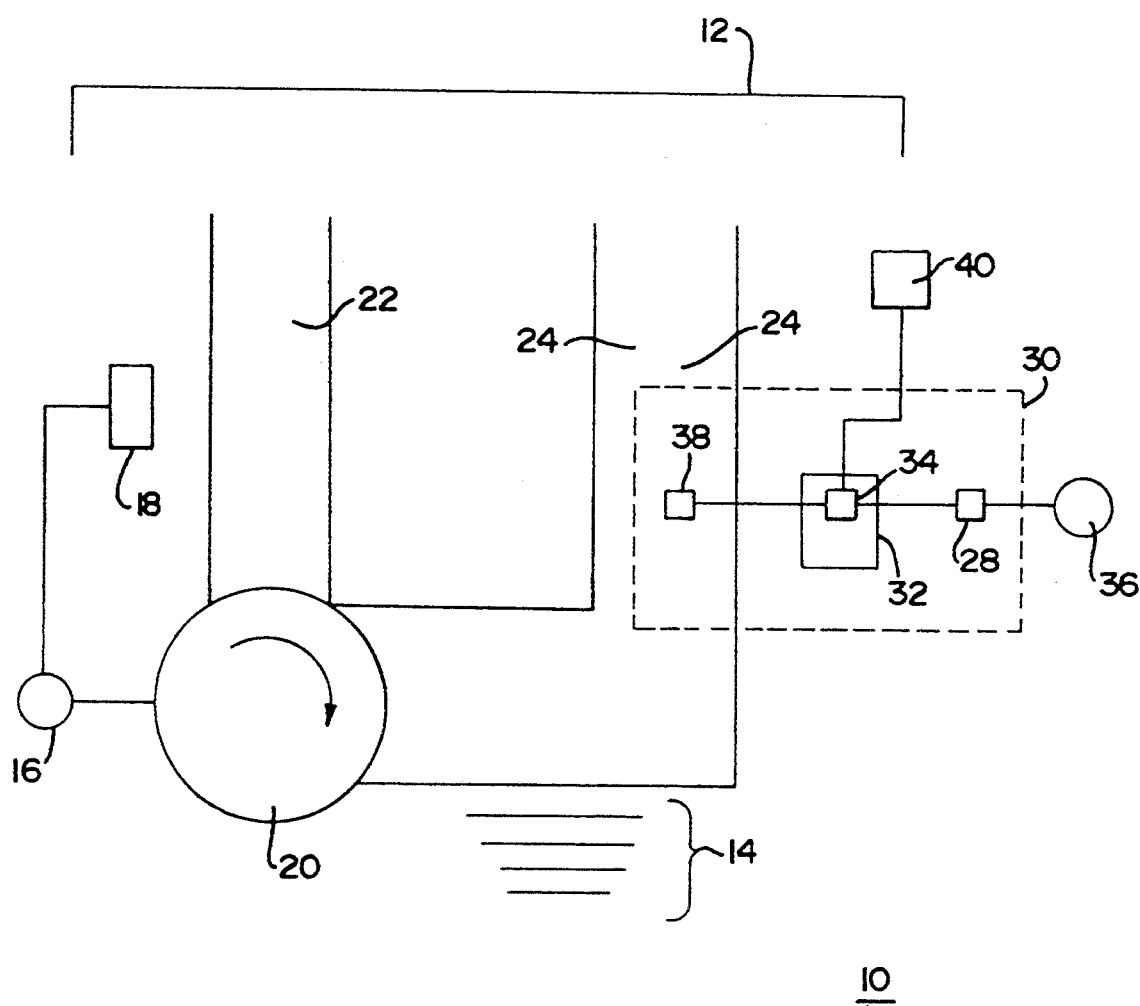
FIG. 1 is a schematic view of a control circuit for the heating unit and humidification system of the present invention.
Figure 2:
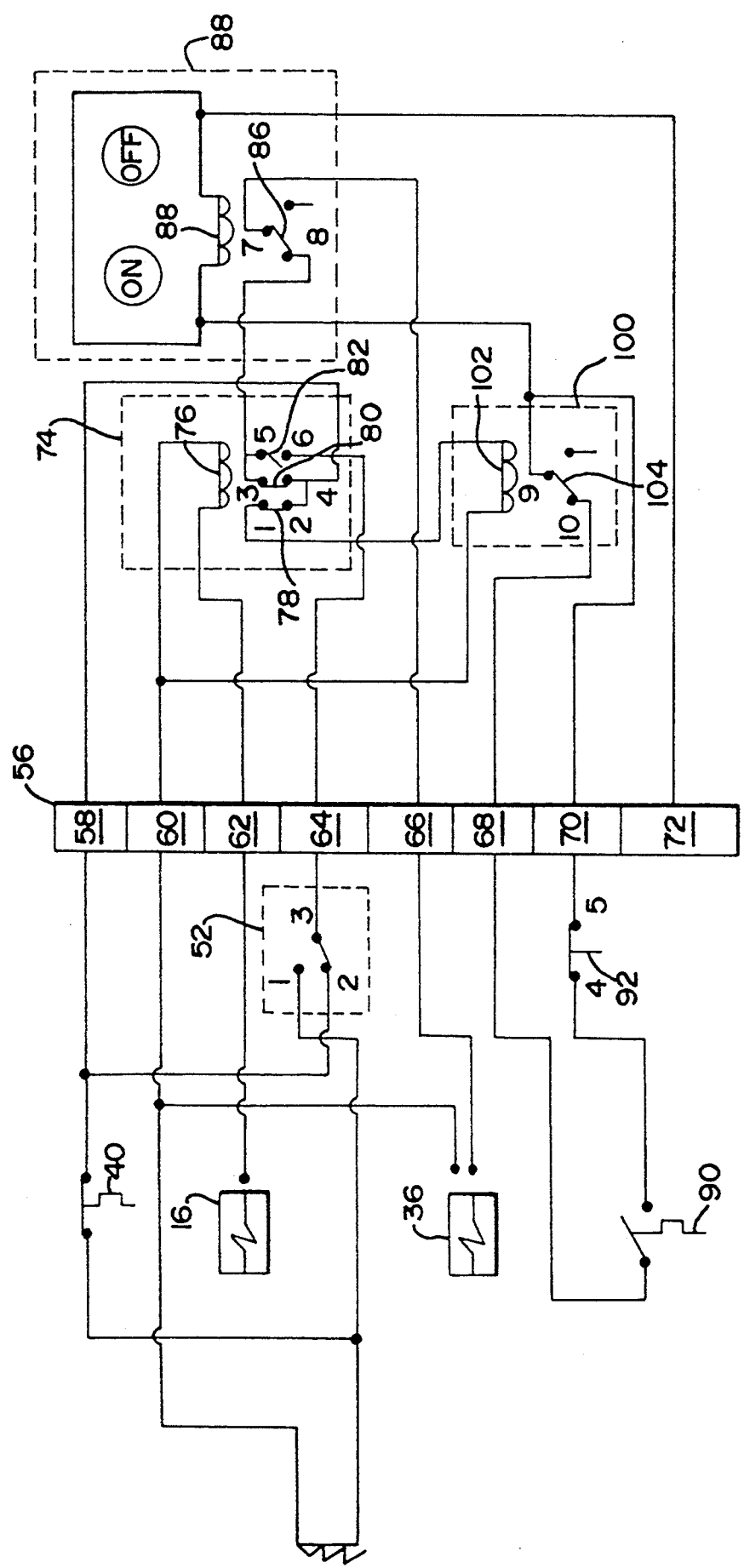
FIG. 2 is a circuit control diagram illustrating a by-pass mode of the present invention.
Figure 3:
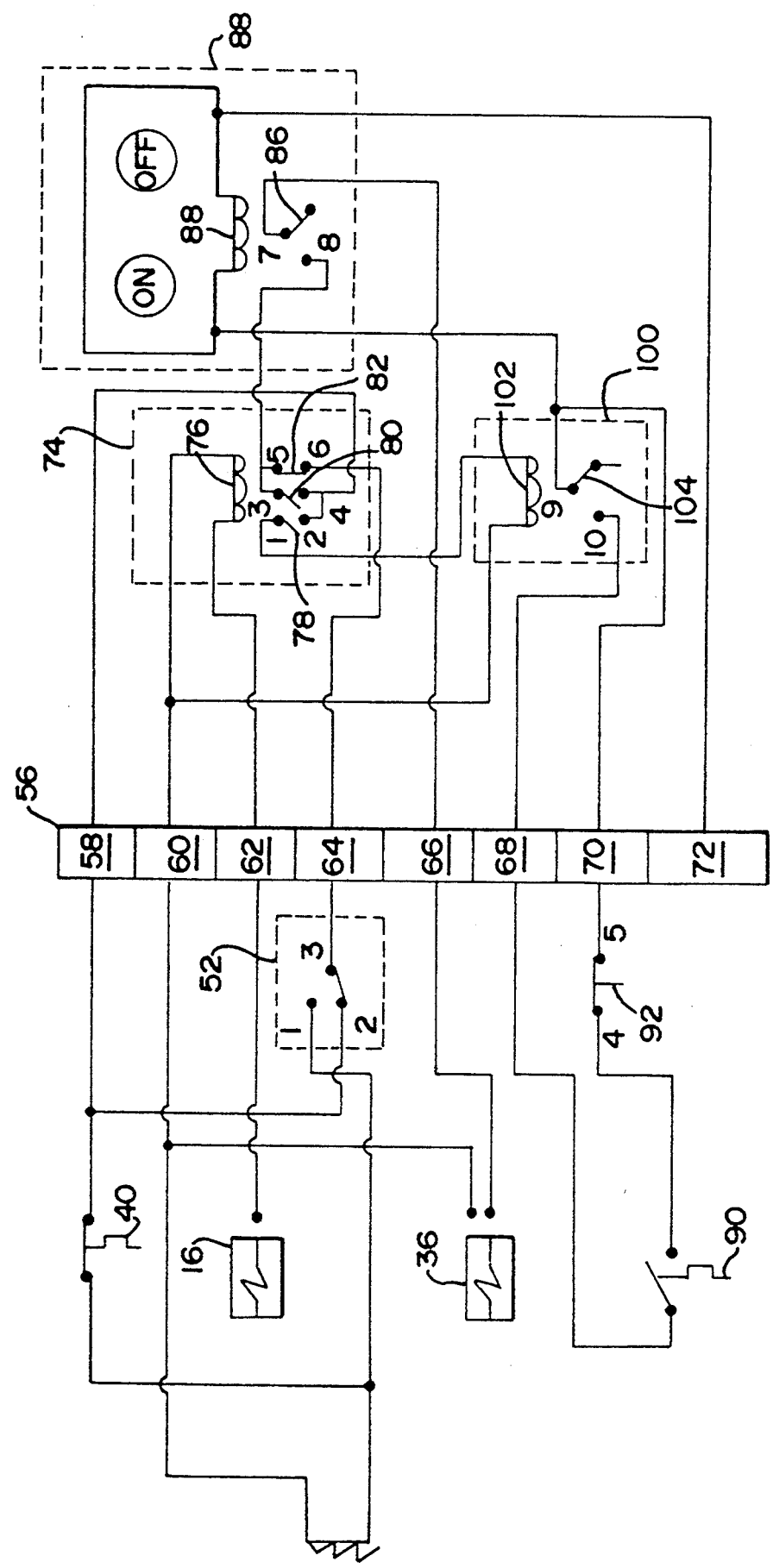
FIG. 3 is a circuit control diagram illustrating a standby mode of the present invention and can be used to explain the unison mode.

FIGS. 1–3, illustrate the preferred apparatus for a humidification control system of the present invention. The present invention shall be explained with reference to the apparatus shown in FIG. 1, but is not specifically limited to such as use of the present invention in other heating systems is contemplated. Throughout the following detailed description, whenever possible the same reference numerals refer to like elements.

As illustrated in FIG. 1, the preferred embodiment of the present invention is described in connection with a fuel-fired hot air furnace, generally indicated by reference numeral 10, used to maintain the temperature in an enclosed volume or area 12, which may be a building or other structure or portion thereof. The furnace 10 is representative of a class of heat sources including forced-air systems, heat pumps and the like. The pertinent components of the furnace 10 include a burner or heat source 14 supplied with fuel, such as gas, oil, or electricity from an appropriate fuel supply, and an electrically actuated fuel valve 16. The operation of the valve 16 is controlled by a conventional thermostatic switch 18, normally located centrally within the enclosed volume 12. The thermostat 18 is of the conventional type wherein a manually or electrically adjusted set-point is compared with a measurement of the actual temperature within the heated volume 12 to control the condition of a switch connected in an electrical circuit with the fuel valve 16.

The furnace 10 further includes a blower or fan 20 which draws air into a cold return duct 22, from the enclosed volume 12, and forces air heated by the burner 14 out into the enclosed volume through a duct 24. The furnace 10 is equipped with an electrically energizable humidifier 30 connected to the existing electrical controls of the furnace 10 with a misting nozzle 38 located in or in communication with the hot air duct 24. The humidifier 30 includes a pulse board or circuit 32, operable to actuate or open and close a solenoid valve 34 located between a water source 36 and misting nozzle 38. The humidifier 30 can further include a water filter 28 located between the water source 36 and solenoid valve 34. The operation of the solenoid valve 34 is controlled by the pulse circuit 32 using a conventional humidistat 40, normally located centrally within the enclosed volume 12. The humidifier 30 can then use the humidistat 40 to regulate the degree of moisture added to the heated air. The degree of moisture that the humidifier 30 adds to the heated air is controllable, either on an on/off basis, or On a proportional control basis by closure of the humidistat 40 which energizes the pulse circuit 32 that actuates the solenoid valve 34. Typically, in prior art applications, the humidifier 30 is controlled by a sail switch, not present in the present arrangement, which is actuated by the blowing of hot air, connected to the fuel valve 16 to receive power when the thermostat switch 18 is closed. However, the present invention provides for the improved operation of a conventional heating system by the humidifier 30 to maintain and efficiently control the moisture of the air.

The preferred embodiment of the humidification control system of the present invention provides a humidifier 30 with a means of controlling various ranges of humidity of any residential or commercial application, using the fan 20, humidistat 40 and the pulse circuit 32 operating in a unison mode, a bypass mode, and a standby mode. The humidistat 40 can operate separately and in conjunction with an active cycle of the furnace 10 so as to advantageously provide precise and efficient control of humidity of the air in the enclosed volume 12.

The operation of the humidifier 30 of the present invention will be described using the humidifier 30 installed in a forced air heating system that uses any type of humidity controller. Briefly, the ability to achieve and maintain humidity levels in the enclosed volume 12 is by the three modes of the pulse circuit 32 and by a separate gain switch 52 incorporated into the pulse circuit 32. In some cases, the gain switch 52 is needed and used to maintain a humidity balance and eliminate large humidity fluctuations during certain heating cycles. The operation of the gain switch 52 will be discussed further herein.

The pulse circuit 32 is designed to provide a pulsed mist of water into the duct 24 using the misting nozzle 38 at a predetermined and adjustable time interval to accommodate a wide range of residential or commercial dwellings. The homeowner or other installer of the humidifier 30 will initially set the predetermined time interval of the pulse circuit 32 after considering the volume or square footage of the enclosed area 12, the capacity of the furnace or heating system 10, the volume of the duct work and other considerations. The pulse circuit 32 operates by way of a cycle timer 50 with adjustable switches for an on cycle 96 and an off cycle 98. These switches can be manually set to energize and deenergize the solenoid valve 34 during a humidification cycle. The cycle timer 50 is adjustable for each of the on 96 and off 98 cycles from one second to one hundred eighty seconds. Thus, the humidifier 30 can operate in a plurality of predetermined time intervals to advantageously increase the efficiency of the system. For example, a 1,500 sq. ft. enclosed area can require a 5 second on cycle 96 and a 5 second off cycle 98. Simply, problems exist when the active cycle of the furnace 10 is a longer period of time than the humidifier 30 requires to moisturize the air. As a result, energizing the humidifier 30 for the duration of the active cycle will add too much moisture to the enclosed area 12, with the excess moisture leaking from the ductwork and causing other problems. Thus, the cycle timer 50 solves these problems and provides for the advantages of increased and efficient moisturization of the air.

In the unison mode, the furnace 10, the fan 20 and the humidifier 30 are all activated, energized and work together to provide moisture to the dry heated air. FIG. 3 illustrates the standby mode. If switches 78 and 80 are open then this would be an illustration of the unison mode which will now be described. The thermostat 18 calls for heat to activate the furnace 10. Upon closure of the thermostatic switch 18, 24 volts A/C is applied to energize and open the fuel valve 16. The same signal or voltage is also applied to a contact 62 of a terminal strip 56 thereby energizing a coil 74 of a relay 76. The relay 76 opens or turns off switches 78 and 80, and closes or turns on switch 82. When the humidistat 40 detects a drop in the humidity below a desired level, actuation of the humidistat 40 results in supplying power to the gain switch 52 thereby providing a signal through contact 64 of the terminal strip 56 and the energization of switch 82 of relay 76. The pulse circuit 32 is energized by closure of the fan limit switch 90 to supply voltage through the summer/winter switch 92 to contact 70 of the terminal strip 56, thereby energizing a coil 94 of pulse timer relay 88 and closing switch 86 of pulse timer relay 88 and to supply power to contact 66 of terminal strip 56 and thus energize the water solenoid valve 34. The humidification of the space continues in conjunction with the heating of the enclosed volume 12 during the active cycle.

As illustrated in FIG. 2, the humidifier 30 can operate in the bypass mode to provide and maintain a humidity level in the enclosed volume 12 at a constant desired level. In the event that the humidity falls below the desired level, and the furnace 10 is not running due to a satisfactory temperature in the enclosed volume 12, the pulse circuit 32 can bypass the heating circuit of the furnace 10. In essence, the burner 14 is deactivated because there is no call for heat by the thermostatic switch 18. The pulse circuit 32 bypasses the heating circuit to energize the blower 20 and energize the solenoid valve 34 to provide a pulsed mist of water, thereby adding humidity to the enclosed volume 12. In this manner, the humidifier 30 can humidify the enclosed volume 12 independently from the normal operation of the furnace 10. As shown in FIG. 2, with the furnace 10 not running, the humidistat 40 senses a drop in humidity below the desired level and energizes contact 58 of the terminal strip 56. Switches 78 and 80 of relay 76 are closed and turned on. Switch 78 of the relay 76 energizes a coil 102 of a bypass relay 100, thereby closing a bypass switch 104 and energizing the pulse timer relay 88. Closure of the switch 86 of the pulse timer relay 88 energizes contact 66 of the terminal strip 56 thereby powering or energizing water solenoid valve 34 to provide a pulsed output of water from the misting nozzle 38. In addition, closure of the bypass switch 104 further energizes contacts 68 and 70 of the terminal strip 56 to energize the blower 20 of the furnace 10.

As illustrated in FIG. 3, the standby mode provides for the interruption of the bypass mode when the thermostatic switch 18 closes and signals to engage the active cycle of the furnace 10. As the humidifier 30 is in the bypass mode and the thermostatic switch 18 closes, the pulse circuit 32 senses this call for heat and places the pulse circuit 32 in the standby mode. The standby mode opens switches 78 and 80 of relay 76 to the water solenoid valve 34 and blower 20, thereby stopping the humidification of the enclosed volume 12. The standby mode is needed to deactivate the humidification so as not to interfere with the normal startup or the efficiency cycle of the furnace 10. Typically, the heat source 14 is allowed to heat the air to a predetermined temperature before the blower 20 is energized so as not to blow cold air into the enclosed volume 12. Once the heat source 14 reaches the required temperature to energize the blower 20, the fan limit switch 90 closes to allow the energization of the blower 20 and the pulse circuit 32 of humidifier 30. If the humidistat 40 is closed or otherwise calls for increased humidity, the pulse circuit 32 will enter the unison mode and the humidification process will resume. Alternatively, closure of the fan limit switch 90 may allow the blower 20 to be energized yet the humidistat 40 is not calling for increased humidity. In this case, the pulse circuit 32 will remain idle until such a call is made by the closure of the humidistat 40. Should the furnace 10 become deactivated when humidistat 40 calls for increased humidity, the pulse circuit 32 will then enter into the bypass mode.

Referring to FIG. 3 when the humidifier 30 is in the bypass mode and humidifying the space, a closure of the thermostatic switch 18 energizes the heat source 14 and fuel valve 16 of the furnace 10 through contact 62 of the terminal strip 56. The coil 74 of relay 76 is energized opening switch 78 thereby deactivating the bypass relay 100 and opening bypass switch 104 to turn off the blower 20 as well as opening the switch 86 to coil 94 of the pulse timer relay 88. Opening switch 86 breaks contact with the solenoid valve 34. At this point the humidifier 30 is in a standby mode with the humidification stopped thereby allowing the furnace 10 to proceed through initial energization. Once the furnace 10 has reached a predetermined temperature for the energization of the blower 20, the fan limit switch 90 is closed to supply 120 volts to the coil 94 of the pulse timer relay 88 and to close switch 86, as long as the humidistat 40 is still calling for an increase in humidity.

In some cases the gain switch 52 is needed to maintain a balance during heating cycles. Simply, when the humidity in the enclosure 12 reaches the desired humidity level and the humidistat 40 is no longer signaling or calling for humidity and the thermostatic switch 18 continues to call for heat, warm dry air continues to be pushed into the space. This can cause problems and result in a substantial percentage drop in the humidity in the enclosed area 12. In furnaces with excess capacity, the substantial drop occurs before the humidistat 40 can sense the loss of moisture and results in the disadvantage of having an inefficient humidification of the enclosed area 12. Ultimately, the humidifier 30 can be energized in the bypass mode to compensate for the large drop in humidity. The gain switch 52 is designed to, if closed or placed in the on position, put the pulse circuit 32 in the unison mode during the active cycle of the furnace 10. Simply, the entire time the furnace provides heat, humidification of the enclosed volume 12 is locked in and the pulse circuit 32 will continue to provide moisture until the deactivation of the active cycle. This has distinct advantages over the prior art in that some structures may require more or less humidity than others due to the type of insolation, windows, and vapor barriers or the like.

Many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A control circuit for a heating and humidification system which system includes a furnace, a fan, a thermostat, and a humidistat, said control circuit including:
   input means for receiving a humidity increase signal from said humidistat;
   pulse means for providing a pulsed output of water in response to said humidity increase signal;
   control means adapted to be connected to said input means, said pulse means, the fan, and the furnace for controlling and energizing said pulse means in response to said humidity increase signal, said control means having a unison mode operable to energize said pulse means during the energization of the furnace and fan, a by-pass mode operable to energize said pulse means and the fan during the deenergization of the furnace, and a stand-by mode operable during said by-pass mode to deenergize said pulse means and the fan and to energize the furnace.

2. A control circuit as in claim 1 wherein said pulse means includes a misting nozzle and said pulse means further includes a solenoid valve adapted to be connected between a water source and said misting nozzle, said pulse means operable to open and close said solenoid valve for generating said pulsed output of water.

3. A control circuit as in claim 2 wherein said pulse means further includes a filter located between the water source and said solenoid valve.

4. A control circuit as in claim 1 wherein said unison mode is operative, after receiving said humidity increase signal from the humidistat and a temperature increase signal from the thermostat, to energize the furnace and the fan before energizing said pulse means.

5. A control circuit as in claim 1 wherein said by-pass mode is operative, after receiving said humidity increase signal from the humidistat and when a temperature increase signal from the thermostat is not detected, to energize the fan and said pulse means.

6. A control circuit as in claim 1 wherein said standby mode is operative, after receiving a temperature increase signal from the thermostat during the operation of said by-pass mode, to deenergize the fan and the pulse means and to energize the furnace.

7. A control circuit as in claim 1 including timer means associated with said pulse means and adapted to energize and deenergize said pulse means for a predetermined unit of time during operation of said unison and by-pass modes.

8. A control circuit as in claim 7 in which said timer means is adjustable to allow an operator to vary the units of time during which said pulse means is energized or deenergized.

9. A control circuit as in claim 1 including a gain means for locking said control means in said unison mode.

10. A humidification system adapted for installation in conjunction with a heating unit and a fan, said system including,
 a humidifier adapted to emit moisture into a ductwork system;
 a humidistat adapted to sense the relative humidity present in the air and to transmit a humidity increase signal when said humidity falls below a preselected value;
 a first electrical circuit connecting said humidistat and said humidifier whereby when said humidity falls below said preselected value, said first circuit energizes said humidifier; and
 means for controlling said first circuit, the fan and the heating unit, said control means operative in a first mode to energize said humidifier during the operation of the fan and heating unit, operative in a second mode to energize the fan and said humidifier while the heating unit is idle, and operative in a third mode for interrupting operation of said second mode so as to energize the heating unit and to deenergize the fan and said humidifier.

11. A humidification system according to claim 10 wherein said humidifier includes means for providing a pulsed mist of liquid to air flowing from the heating unit, said pulse means being connected to said control means, said pulse means having a misting nozzle and said humidification system further including a solenoid valve interposed between a source of liquid and said misting nozzle, said control means adapted to energize said pulse means to open and close said solenoid valve to allow said liquid to pass through said misting nozzle.

12. A humidification system according to claim 11 further including filter means connected between the liquid source and said solenoid valve, said filter means operative to filter liquid transmitted to said solenoid valve.

13. A humidification system according to claim 10 including timer means associated with said humidifier adapted to energize and deenergize said humidifier for a predetermined unit of time during operation of said first and second modes.

14. A humidification system according to claim 13 in which said timer means is adjustable to allow an operator to vary the humidifier energization and deenergization times between predetermined values.

15. A humidification system according to claim 10 including a gain means for locking said control means in said first mode.

* * * * *